US005601734A

United States Patent [19]

Luo et al.

[11] Patent Number: 5,601,734

[45] Date of Patent: *Feb. 11, 1997

[54] ELECTRODE FOR A PLASMA ARC TORCH

[75] Inventors: Lifeng Luo, Mayfield Heights, Ohio; Richard W. Couch, Jr., Hanover, N.H.

[73] Assignee: Hypertherm, Inc., Hanover, N.H.

[ * ] Notice: The term of this patent shall not extend beyond the expiration date of Pat. No. 5,464,962.

[21] Appl. No.: 554,638

[22] Filed: Nov. 6, 1995

Related U.S. Application Data

[63] Continuation of Ser. No. 283,070, Jul. 29, 1994, Pat. No. 5,464,962, which is a continuation-in-part of Ser. No. 886, 067, May 20, 1992, Pat. No. 5,310,988.

[51] Int. Cl.$^{6}$ .......... B23K 10/00

[52] U.S. Cl. .......... 219/121.52; 219/119; 219/121.49

[58] Field of Search .......... 219/121.48, 121.52, 219/118, 119, 121.59, 121.49

[56] References Cited

U.S. PATENT DOCUMENTS

| | | | |
|---|---|---|---|
| 3,592,994 | 7/1971 | Ford | 219/119 |
| 3,676,639 | 7/1972 | Esiban et al. | 219/75 |
| 3,930,139 | 12/1975 | Bykhovsky et al. | 219/75 |
| 4,133,987 | 1/1979 | Lakomsky et al. | 219/121.52 |
| 4,521,666 | 6/1985 | Severance, Jr. et al. | 217/121 |
| 4,701,590 | 10/1987 | Hatch | 219/121.52 |
| 4,766,349 | 8/1988 | Johansson et al. | 219/121.52 |
| 4,782,210 | 11/1988 | Nelson et al. | 219/121.52 |
| 5,023,425 | 6/1991 | Severance, Jr. | 219/121 |
| 5,097,111 | 3/1992 | Severance, Jr. | 219/121.52 |
| 5,105,061 | 4/1992 | Blankenship | 219/121 |

FOREIGN PATENT DOCUMENTS

| | | |
|---|---|---|
| 0314791 | 10/1989 | European Pat. Off. . |
| 0371128 | 6/1990 | European Pat. Off. . |
| 2014833 | 4/1970 | France . |
| 2173875 | 10/1973 | France . |

*Primary Examiner*—Mark H. Paschall
*Attorney, Agent, or Firm*—Testa, Hurwitz & Thibeault, LLP

[57] ABSTRACT

An insert securely disposed in a bottom end of an electrode has an exposed emission surface shaped to define a recess in the insert, wherein the recess is initially dimensioned as a function of the operating current level of the torch, the diameter of the insert, and the plasma gas flow pattern in the torch. The electrode has an elongated body formed of a high thermal conductivity material such as copper, and a bore disposed in the bottom end of the body along a central axis. The insert is formed of a high thermionic emissivity material, such as hafnium, and securely disposed in the bore with the emission surface exposed. The emission surface may be initially shaped by removing a predetermined amount of the high thermionic emissivity material from the insert to define a generally concave recess, a generally cylindrical recess or other shapes. When used in a torch, the electrode provides for reduced deposition of the high thermionic emissivity material on the nozzle, thereby reducing nozzle wear in the torch.

20 Claims, 3 Drawing Sheets

ELECTRODE FOR A PLASMA ARC TORCH

RELATED APPLICATIONS

This is a continuation of application Ser. No. 08/283,070 filed on Jul. 29, 1994, now U.S. Pat. No. 5,464,962, which is a continuation-in-part of U.S. Ser. No. 07/886,067, filed May 20, 1992 U.S. Pat. No. 5,310,988.

FIELD OF THE INVENTION

The invention relates generally to the field of plasma arc cutting torches and processes. In particular, the invention relates to an improved electrode for use in a plasma arc cutting torch and a method of manufacturing such electrode.

BACKGROUND OF THE INVENTION

Plasma arc torches are widely used in the cutting of metallic materials. A plasma arc torch generally includes a torch body, an electrode mounted within the body, a nozzle with a central exit orifice, electrical connections, passages for cooling and arc control fluids, a swirl ring to control the fluid flow patterns, and a power supply. The torch produces a plasma arc, which is a constricted ionized jet of a plasma gas with high temperature and high momentum. The gas can be non-reactive, e.g. nitrogen or argon, or reactive, e.g. oxygen or air.

In process of plasma arc cutting of a metallic workpiece, a pilot arc is first generated between the electrode (cathode) and the nozzle (anode). The pilot arc ionizes gas passing through the nozzle exit orifice. After the ionized gas reduces the electrical resistance between the electrode and the workpiece, the arc then transfers from the nozzle to the workpiece. The torch is operated in this transferred plasma arc mode, characterized by the conductive flow of ionized gas from the electrode to the workpiece, for the cutting of the workpiece.

In a plasma arc torch using a reactive plasma gas, it is common to use a copper electrode with an insert of high thermionic emissivity material. The insert is press fit into the bottom end of the electrode so that an end face of the insert, which defines an emission surface, is exposed. The insert is typically made of hafnium or zirconium and is cylindrically shaped. While the emission surface is typically planar, it is known to put a small dimple in the end face primarily for centering purposes. For example, Hypertherm manufactures and sells an electrode with an insert having a small dimple in the exposed end face for its 260 ampere oxygen plasma cutting systems.

In all plasma arc torches, particularly those using a reactive plasma gas, the electrode shows wear over time in the form of a generally concave pit at the exposed emission surface of the insert. The pit is formed due to the ejection of molten high emissivity material from the insert. The emission surface liquefies when the arc is first generated, and electrons are emitted from a molten pool of high emissivity material during the steady state of the arc. However, the molten material is ejected from the emission surface during the three stages of torch operation: (1) starting the arc, (2) steady state of the arc, and (3) stopping the arc. A significant amount of the material deposits on the inside surface of the nozzle as well as the nozzle orifice.

The problem of high emissivity material deposition during the plasma arc start and stop stages is addressed by U.S. Pat. Nos. 5,070,227 and 5,166,494, commonly assigned to Hypertherm. It has been found that the heretofore unsolved problem of high emissivity material deposition during the steady state of the arc not only reduces electrode life but also causes nozzle wear.

The nozzle for a plasma arc torch is typically made of copper for good electrical and thermal conductivity. The nozzle is designed to conduct a short duration, low current pilot arc. As such, a common cause of nozzle wear is undesired arc attachment to the nozzle, which melts the copper usually at the nozzle orifice.

Double arcing, i.e. an arc which jumps from the electrode to the nozzle and then from the nozzle to the workpiece, results in undesired arc attachment. Double arcing has many known causes and results in increased nozzle wear and/or nozzle failure. It has been recently discovered that the deposition of high emissivity insert material on the nozzle also causes double arcing and shortens the nozzle life.

It is therefore a principal object of this invention to reduce the nozzle wear by minimizing the deposition of high emissivity material on the nozzle during the cutting process.

Another principal object of the invention is to provide an electrode for a plasma arc torch that results in an improved cut quality.

Yet another principal object of the invention is to maintain the electrode life while providing an electrode that reduces nozzle wear.

SUMMARY OF THE INVENTION

A principal discovery of the present invention is that during operation of a conventional plasma arc torch, the arc and the gas flow actually force the shape of the emissive surface of the insert to be generally concave at steady state. More specifically, the curvature of this preferred concave shape is a function of the current level of the torch, the diameter of the insert and the gas flow pattern in the torch. Since the emissive surface has a generally planar initial shape in conventional torches, the high emissivity material melts during operation of the torch and is ejected from the insert until the emission surface has the generally concave shape. Thus, the shape of the emission surface of the insert changes rapidly until reaching the preferred concave shape at steady state.

Another principle discovery of the present invention is that the deposition of the high emissivity material onto the nozzle during operation of the torch causes double arcing that damages the edge of the nozzle orifice and thus increasing nozzle wear.

Accordingly, the present invention features an improved electrode for a plasma arc cutting torch which minimizes the deposition of high emissivity material on the nozzle. The electrode comprises an elongated electrode body formed of a high thermal conductivity material such as copper. A bore is disposed in the bottom end of the electrode body along a central axis through the body. A generally cylindrical insert formed of a high thermionic emissivity material such as hafnium is securely disposed in the bore. An emission surface is located along an end face of the insert and exposable to plasma gas in the torch body.

In accordance with the present invention, the emission surface is shaped to define a predetermined recess in the insert. The recess is initially dimensioned as a function of the operating current level of the torch, the diameter of the cylindrical insert and the plasma gas flow pattern in the torch. More specifically, sufficient high emissivity material is removed from the insert to provide an emission surface defining a recess initially dimensioned to minimize the deposition of such material on the nozzle during operation of the torch. The emission surface may define a recess which is generally concave, generally cylindrical or other shapes. The initial shape can be of various forms because the emission surface melts to the preferred shape during operation of the torch. However, because sufficient material has been initially removed from the insert, deposition of such material onto the nozzle as the emission surface melts to the preferred shape is minimal.

The present invention also features a method of manufacturing the improved electrode for a plasma arc cutting torch. An electrode body is formed from a high thermal conductivity material (e.g. copper) and a bore is formed in an bottom end of the electrode body. An insert is formed from a high thermionic emissivity material., The insert is positioned in the bore to expose an emission surface of the insert. In accordance with the present invention, a predetermined amount of the high emissivity material is removed from the insert such that the emission surface initially defines a recess in the insert. The amount of material removed from the insert is a function of current level of the torch, the diameter of the insert, and the plasma gas flow pattern in the torch.

An electrode incorporating the principles of the present invention offers significant advantages of existing electrodes. One advantage of the invention is that double arcing due to the deposition of high emissivity material on the nozzle is minimized by the improved electrode design. As such, nozzle life and cut quality are improved. Another advantage is that electrode life is maintained in electrodes constructed in accordance with the invention. Since the amount of high emissivity material initially removed corresponds to that amount ejected from the conventional electrode during the first several starts, the improved electrode offers wear rates comparable to conventional devices.

BRIEF DESCRIPTION OF THE DRAWINGS

The foregoing and other objects, features and advantages of the invention will become apparent from the following more particular description of preferred embodiments of the invention, as illustrated in the accompanying drawings. The drawings are not necessarily to scale, emphasis instead being placed on illustrating the principles of the present invention.

DETAILED DESCRIPTION

Figure 1:
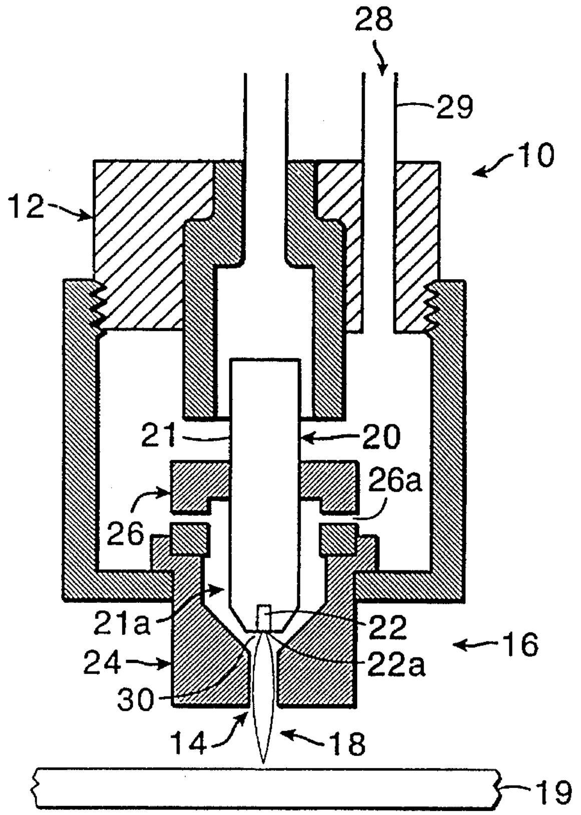
FIG. 1 is a cross-sectional view of a conventional plasma arc cutting torch.

FIG. 1 illustrates in simplified schematic form a typical plasma arc cutting torch 10 representative of any of a variety of models of torches sold by Hypertherm, Inc. The torch has a body 12 which is typically cylindrical with an exit orifice 14 at a lower end 16. A plasma arc 18, i.e. an ionized gas jet, passes through the exit orifice and attaches to a workpiece 19 being cut. The torch is designed to pierce and cut metal, particularly mild steel, or other materials in a transferred arc mode. In cutting mild steel, the torch operates with a reactive gas, such as oxygen or air, as the plasma gas to form the transferred plasma arc 18.

The torch body 12 supports a copper electrode 20 having a generally cylindrical body 21. A hafnium insert 22 is press fit into the lower end 21*a* of the electrode so that a planar emission surface 22*a* is exposed. The torch body also supports a nozzle 24 which is spaced from the electrode. The nozzle has a central orifice that defines the exit orifice 14. A swirl ring 26 mounted to the torch body has a set of radially offset (or canted) gas distribution holes 26*a* that impart a tangential velocity component to the plasma gas flow causing it to swirl. This swirl creates a vortex that constricts the arc and stabilizes the position of the arc on the insert.

In operation, the plasma gas 28 flows through the gas inlet tube 29 and the gas distribution holes in the swirl ring. From there, it flows into the plasma chamber 30 and out of the torch through the nozzle orifice. A pilot arc is first generated between the electrode and the nozzle. The pilot arc ionizes the gas passing through the nozzle orifice. The arc then transfers from the nozzle to the workpiece for the cutting the workpiece. It is noted that the particular construction details of the torch body, including the arrangement of components, directing of gas and cooling fluid flows, and providing electrical connections can take a wide variety of forms.

Figure 2A:
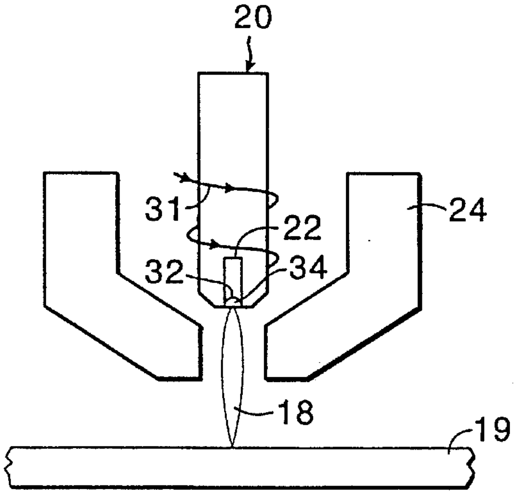
FIG. 2A is a partial cross-sectional view of the torch shown in FIG. 1 illustrating the forced concave shape of the emissive surface of the electrode insert during operation of the torch.

Referring to FIG. 2A, it has been discovered that during operation of a conventional plasma arc torch, the arc 18 and the gas flow 31 in the chamber 30 actually force the shape of the emissive surface 32 of the hafnium insert to be generally concave at steady state. Because the emissive surface has a generally planar initial shape in a conventional torch, molten hafnium is ejected from the insert during operation of the torch until the emission surface has the generally concave shape. Thus, the shape of the emission surface of the insert changes rapidly until reaching the forced concave shape at steady state. The result is a pit 34 being formed in the insert.

It has been determined that the curvature of the concave shaped surface 32 is a function of the current level of the torch, the diameter (A) of the insert and the gas flow pattern 31 in plasma chamber of the torch. Thus, increasing the current level for a constant insert diameter results in the emission surface having a deeper concave shaped pit. Similarly, increasing the diameter of the hafnium insert or the swirl strength of the gas flow while maintaining a constant current level results in a deeper concave shape.

Figure 2B:
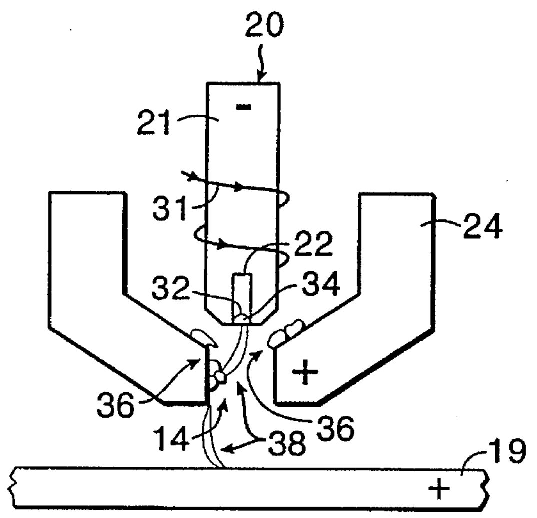
FIG. 2B is a partial cross-sectional view of the torch shown in FIG. 1 illustrating the problems of double arcing and nozzle wear caused by hafnium deposition on the nozzle during operation of the torch.

Referring to FIG. 2B, it has also been discovered that the molten hafnium 36 ejected from the insert during operation of the torch is deposited onto the nozzle causing a double arc 38 which damages the edge of the nozzle orifice 14 and increases nozzle wear. After pilot arc transfer, the nozzle is normally insulated from the plasma arc by a layer of cold gas. However, this insulation is broken by molten hafnium being ejected into the gas layer, causing the nozzle to become an easier path for the transferred plasma arc. The result is double arcing as shown.

In accordance with the present invention, an improved electrode 40 for a plasma arc cutting torch minimizes hafnium deposition onto the nozzle. The electrode comprises a cylindrical electrode body 42 formed of a high thermal conductivity material such as copper. A bore 44 is drilled in the bottom end 46 of the electrode body along a central axis (X) through the body. A generally cylindrical insert 48 formed of a high thermionic emissivity material such as hafnium is press fit in the bore. An emission surface 50 is located along the end face of the insert and exposable to plasma gas in the torch body.

Figure 3A:
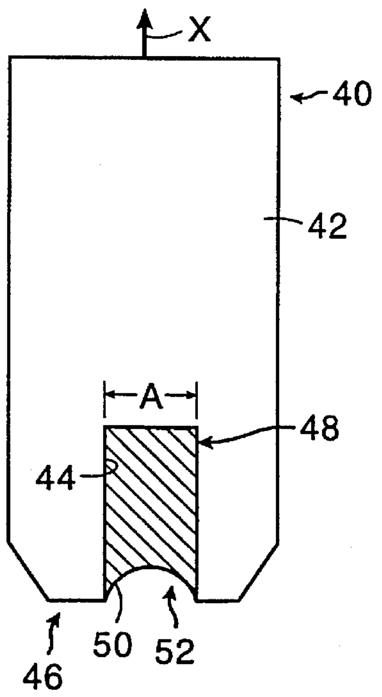
FIGS. 3A–3B are cross-sectional views of electrodes incorporating the principles of the present invention.
Figure 3B:
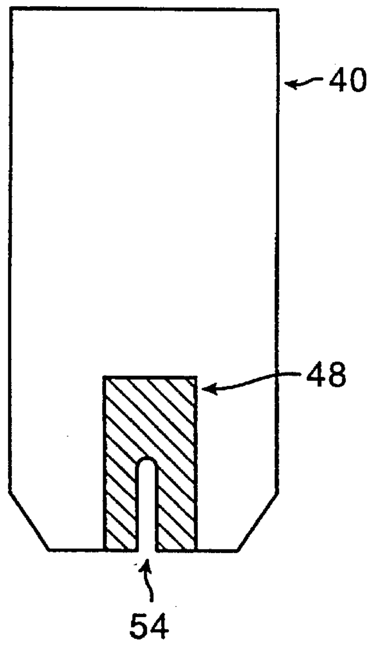

One aspect of the present invention is that the emission surface 52 is shaped to define a predetermined recess 52 in the insert. The recess is initially dimensioned as a function of the operating current level of the torch, the diameter (A) of the cylindrical insert and the plasma gas flow pattern in the torch. Based on these parameter, a sufficient amount of hafnium is initially removed from the insert to provide an emission surface which deposits a minimal amount of hafnium on the nozzle during operation of the torch. The emission surface may define a generally concave recess 52 (FIG. 3A), generally cylindrical recess 54 (FIG. 3B) or other shapes. While emission surfaces defining certain recess shapes are desirable due to their ease of manufacture, the initial shape of the recess is less important than its overall dimensions. This is because the emission surface melts to the preferred shape during operation of the torch. More importantly, a sufficient amount of hafnium must be initially removed from the insert as as to minimize hafnium deposition on the nozzle as the emission surface melts to the preferred shape.

By way of illustration, an experiment was conducted to optimize the initial shape of the emission surface as a function of current level and gas flow pattern for a constant insert diameter. An electrode with an insert having an emission surface initially shaped to define a shallow concave recess was initially used in a torch. The torch was used to cut a workpiece. The dimensions of the recess and the nozzle condition were checked after each cut. It was observed that the depth of the recess increased after several cuts when the initial shape was insufficient. The nozzle collected a noticeable amount of hafnium deposition and double arcing was observed. The experiment was stopped when the nozzle became damaged.

The experiment was successively repeated using electrodes having emission surfaces initially shaped to define deeper concave recesses until double arcing due to hafnium deposition on the nozzle stopped. The initial shape of the recess for the electrode used when double arcing stopped was selected as the optimal dimensions for an electrode usable in a torch having the required cutting parameters. By way of example and not limitation, an HT4000 plasma torch manufactured by Hypertherm operates with a plasma arc current of 340 amperes, an insert diameter of 0.072 inch and a standard HT4000 swirl ring. The above described experiment results in an electrode having an emission surface initially shaped to define a generally concave recess with a depth of about 0.024 inch (at the central axis through the electrode) to minimize nozzle wear.

Figure 4A:
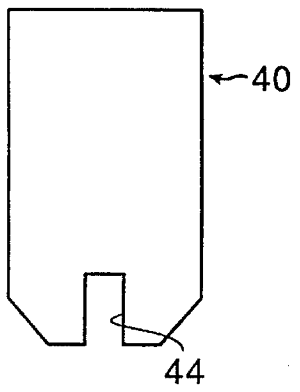
FIGS. 4A–4C show a method of manufacturing an electrode incorporating the principles of the present invention.
Figure 4B:
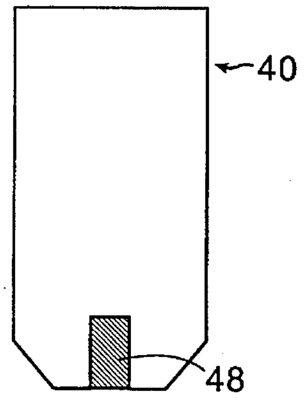
Figure 4C:
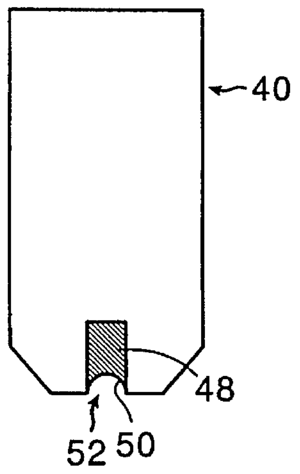

Referring to FIGS. 4A–4C, the present invention also features a method of manufacturing the improved electrode for a plasma arc cutting torch. An electrode body 40 is formed from a high thermal conductivity material (e.g. copper) and a bore 44 is formed in an bottom end of the body (FIG. 4A). An insert 48 formed from a high thermionic emissivity material (e.g. hafnium) is positioned in the bore to expose an emission surface of the insert (FIG. 4B).

A predetermined amount of the high emissivity material is removed from the insert such that the emission surface 50 initially defines a recess 52 (FIG. 4C). As noted previously, the amount of material removed from the insert is a function of current level of the torch, the diameter of the insert, and the plasma gas flow pattern in the torch.

In one embodiment, the high emissivity material is removed using a ball end mill, which provides a close approximation to the preferred concave shape. Since the initial shape of the recess is less important than the amount of material initially removed from the insert, other devices may be used to remove the material. For example, a drilling device can be used to drill a generally cylindrical hole into the center of the emission surface.

EQUIVALENTS

While the invention has been particularly shown and described with reference to specific preferred embodiments, it should be understood by those skilled in the art that various changes in form and detail may be made therein without departing from the spirit and scope of the invention as defined by the appended claims. For example, although the steps for manufacturing the improved electrode were described in a particular sequence, it is noted that their order can be changed without departing from spirit and scope of the invention.

We claim:

1. An electrode for use in a plasma arc torch, the electrode comprising:

an elongated electrode body formed of a high thermal conductivity material and having a bore disposed in a bottom end of the electrode body along a central axis extending longitudinally through the elongated electrode body;

an insert formed of a high thermionic emissivity material disposed in the bore such that an emission surface of the insert is exposed;

the emission surface being initially shaped to define a predetermined recess in the insert, the predetermined recess having an initial depth relative to a central axis extending longitudinally through the electrode body which is proportional to an operating current level of the torch, a diameter of the insert, and a plasma gas flow pattern in the torch.

2. The electrode of claim 1 wherein the emission surface is shaped to define a generally concave recess.

3. The electrode of claim 1 wherein the emission surface is shaped to define a generally cylindrical recess.

4. The electrode of claim 1 wherein the generally cylindrical recess includes a concave portion.

5. The electrode of claim 1 wherein emission surface is shaped to define a recess dimensioned to approximate an arc preferred shape.

6. The electrode of claim 1 wherein the insert comprises hafnium.

7. The electrode of claim 1 wherein the electrode body comprises copper.

8. An electrode for use in a plasma arc cutting torch having a torch body and a nozzle, the electrode comprising:

an elongated electrode body formed of a high thermal conductivity material and having a bore disposed in a bottom end of the electrode body along a central axis extending longitudinally through the elongated electrode body;

a generally cylindrical insert formed of a high thermionic emissivity material securely disposed in the bore such that an emission surface located along an end face of the insert is exposable to plasma gas in the torch body;

the emission surface being initially shaped to define a predetermined recess in the insert, the predetermined recess having an initial depth relative to a central axis extending longitudinally through the elongated electrode body which is proportional to an operating current level of the torch, a diameter of the insert, and a plasma gas flow pattern in the torch, to thereby reduce deposition of molten high thermionic emissivity material on the nozzle during operation of the torch.

9. The electrode of claim 8 wherein the emission surface defines a generally concave recess.

10. The electrode of claim 9 wherein the emission surface defines a recess including a generally cylindrical portion.

11. A method of manufacturing an electrode for use in a plasma arc torch, comprising the steps of:

forming an electrode body from a high thermal conductivity material and a bore in a bottom end of the electrode body along a central axis extending longitudinally through the elongated electrode body;

forming an insert from a high thermionic emissivity material, the insert being positionable in the bore to expose an emission surface of the insert; and removing a predetermined amount of the high thermionic emissivity material from the insert such that the emission surface defines a predetermined recess in the insert having an initial depth relative to the central axis extending longitudinally through the elongated electrode body which is proportional to an operating current level of the torch, diameter of the insert, and plasma gas flow pattern in the torch.

12. The method of claim 11 further comprising the step of positioning the insert in the bore to expose the emission surface.

13. The method of claim 12 further comprising performing the positioning step prior to performing the removing step.

14. The method of claim 11 further wherein the emission surface defines a generally concave recess.

15. The method of claim 11 wherein the emission surface define a generally cylindrical recess.

16. The method of claim 11 wherein the removing step further comprises removing a predetermined amount of the high thermionic emissivity material from the insert with a lathe or a ball end mill.

17. The method of claim 11 wherein the generally cylindrical recess includes a concave portion.

18. A method of manufacturing an electrode for use in a plasma arc cutting torch, comprising the steps of:

forming an electrode body from a high thermal conductivity material and a bore in a bottom end of the electrode body along a central axis extending longitudinally through the elongated electrode body;

forming a generally cylindrical insert from a high thermionic emissivity material;

positioning the insert in the bore such that an emission surface located along an end face of the insert is exposed; and removing a predetermined amount of the high thermionic emissivity material from the insert such that the emission surface defines a recess in the insert having an initial depth relative to the central axis extending longitudinally through the elongated electrode body which is proportional to an operating current level of the torch, diameter of the insert, and plasma gas flow pattern in the torch, to thereby minimize deposition of molten high thermionic emissivity material on the nozzle during operation of the torch.

19. The method of claim 18 further wherein the emission surface defines a generally concave or cylindrical recess.

20. The method of claim 18 further wherein the emission surface defines a recess dimensioned to approximate an arc preferred shape.

* * * * *